United States Patent [19]

Kajimura et al.

[11] 4,442,232

[45] Apr. 10, 1984

[54] EXPANDABLE STYRENE-MALEIC ANHYDRIDE COPOLYMER PARTICLES AND A PROCESS FOR MOLDING THE SAME

[75] Inventors: Mutsuhiko Kajimura, Moriyama; Tetsuji Maeda, Nara, both of Japan

[73] Assignee: Sekisui Plastic Co., Ltd., Tokyo, Japan

[21] Appl. No.: 206,080

[22] Filed: Nov. 12, 1980

Related U.S. Application Data

[62] Division of Ser. No. 146,012, May 2, 1980, Pat. No. 4,278,627.

[30] Foreign Application Priority Data

May 7, 1979 [JP] Japan .................................. 54-56047

[51] Int. Cl.³ .............................. C08J 9/18; C08J 9/20
[52] U.S. Cl. ........................................ 521/56; 521/53; 521/58; 521/60; 521/88; 521/147
[58] Field of Search ...................... 521/53, 56, 58, 60, 521/88, 147

[56] References Cited

U.S. PATENT DOCUMENTS

| | | | |
|---|---|---|---|
| 3,547,838 | 12/1970 | Moore et al. | 521/147 |
| 3,742,103 | 6/1973 | Spicuzza, Jr. | 521/147 |
| 3,770,688 | 11/1973 | Corbett et al. | 521/60 |
| 3,975,327 | 8/1976 | Nintz et al. | 521/60 |
| 4,278,627 | 7/1981 | Kajimura et al. | 521/56 |

*Primary Examiner*—Morton Foelak
*Attorney, Agent, or Firm*—Armstrong, Nikaido, Marmelstein & Kubovcik

[57] ABSTRACT

Expandable styrene-maleic anhydride copolymer particles which comprises a copolymer resin obtained by reaction of a styrene-maleic anhydride copolymer with a hydroxy compound and further impregnated with a volatile blowing agent.

9 Claims, No Drawings

EXPANDABLE STYRENE-MALEIC ANHYDRIDE COPOLYMER PARTICLES AND A PROCESS FOR MOLDING THE SAME

This is a division of application Ser. No. 146,012, filed May 2, 1980, now U.S. Pat. No. 4,278,627.

BACKGROUND OF THE INVENTION

1. Field of the Invention

This invention relates to new expandable styrene-maleic anhydride copolymer particles and a process for molding the same. According to the present invention, there is provided novel expandable styrene-maleic anhydride copolymer particles in which the base copolymer is modified with a hydroxy compound containing from two to four active hydroxy groups and which are useful in the production of various foamed articles, and a method of molding said expandable copolymer particles whose use amount can be considerably saved.

2. Description of the Prior Art

Styrene-maleic anhydride copolymers containing 2-25 w/w% of maleic anhydride component to be used as the base resins of the present invention have a higher heat deflection temperature than that of conventional polystyrenes and are expected to be utilized in various fields which require thermal stability.

The production of foamed articles from said copolymer resins has been achieved by extrusion but was difficult by so-called bead molding. For this reason, there has been a proposal of reacting the copolymer, with monovalent alcohol to obtain expandable particles usable for bead molding (U.S. Pat. No. 3,742,103). However, the resulting expandable particles gave pre-expanded particles having a comparatively low bulk density upon pre-expanding but needed to charge an excessive amount of the pre-expanded particles in cavity when required for bead molding.

SUMMARY OF THE INVENTION

It has now been found that foamed articles having low density as well as excellent thermal stability can be obtained without charging superfluous amount of pre-expanded particles in a mold cavity, when expandable copolymer particles are used, which are prepared by the reaction of styrene-maleic anhydride copolymer with a hydroxy compound having at least two active hydroxy groups and the further impregnation of the resulting modified copolymer with a blowing agent.

According to the invention, it provides expandable styrene-maleic anhydride copolymer particles which comprise a copolymer obtained by the reaction of a styrene-maleic anhydride copolymer, with a hydroxy compound having from 2-4 active hydroxy groups and 2-15 carbon atoms in an amount of 2.5-150 mol% relative to the maleic anhydride moiety of said copolymer and further impregnated with a volatile blowing agent, and also a process for preparing said expandable styrene-maleic anhydride copolymer particles. Also, it provides a process for molding pre-expanded particles of said expandable styrene-maleic anhydride copolymer particles in the same or slightly excessive amount as the volume of a mold cavity to be utilized.

DETAILED DESCRIPTION OF THE PREFERRED EMBODIMENTS

The base resins to be used in the invention are styrene-maleic anhydride copolymers containing 2-25 w/w% of maleic anhydride component (preferably 5-15 w/w%) and having an average degree of polymerization of 500-4000 (preferably 900-2000). These resins can be prepared by the methods disclosed in, e.g. U.S. Pat. Nos. 2,971,935, 2,769,804, 2,989,517 and 3,509,110 and are commercially available under the trade name of Dylark (ARCO/Polymers Inc., U.S.A.).

The base resins may be used in the form of particles such as pellets, granules or particulate pieces. The preferred particles are pellets or beads. For example, pellets of the resins may be obtained by block-polymerizing styrene with maleic anhydride in the presence of a catalyst and subjecting the resulting copolymer to extrusion.

In the production of the expandable styrene-maleic anhydride copolymer particles of the present invention, the base resin particles are suspended in an aqueous medium.

The ratio (by weight) of the base resin and the aqueous medium may be approximately 1:1 in a small scale. However, in an industrial scale, the ratio may be 1:0.7-5, but the amount of the aqueous medium is preferred to be diminished to the maximum extent as possible.

The aqueous medium comprises water and an appropriate amount of a suspending agent. As the suspending agents, there may be used organic compounds such as a partially saponified polyvinyl alcohol, a salt of polyacrylic acid, polyvinyl pyrrolidone, carboxymethylcellulose, methylcellulose, calcium stearate, ethylene bis-stearoamide or the like; fine powders of water-sparingly soluble inorganic compounds such as calcium pyrophosphate, calcium phosphate, calcium carbonate, magnesium carbonate, magnesium phosphate, magnesium pyrophosphate, magnesium oxide or the like. When the inorganic compounds are used as the suspending agent, it is preferable to add surfactants such as sodium dodecylbenzenesulfonate, in an amount of 0.01-0.10 w/w% to water. The amount of the suspending agent may be in the range from 0.01 to 5 w/w% to water.

The term of "active hydroxy group" used in the present invention means the hydroxy group which can react with maleic anhydride moiety of the base resin at an elevated temperature. The preferred numbers of the active hydroxy groups in the hydroxy compound are two.

As the hydroxy compounds, there may be mentioned:

(a) a compound of the formula: HO—R—OH wherein R is a straight or branched-chain alkylene group having 2-6 carbon atoms which may be substituted by one or two hydroxy groups; or a group of the formula:

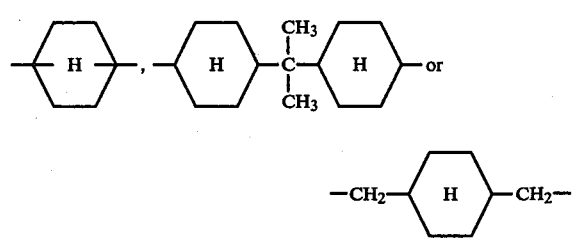

(b) a compound of the formula: H—(OR$_1$)n—OH wherein n is an integer of 2-4 and R$_1$ is a straight-chain alkylene group of 2-4 carbon atoms;

(c) a polyhydric phenol which may be substituted by a lower alkyl group or a halogen atom and (d) an alkanoyl diethanolamide.

Concrete examples of the compound (a) are ethylene glycol, 1,2(or 1,3)-propanediol, 1,2(or 1,3 or 1,4 or 2,3)-butanediol, 1,2(or 1,4 or 1,5 or 2,3 or 2,4)-pentanediol, 1,4(or 1,5 or 1,6 or 2,5)-hexanediol, 1,2(or 1,3 or 1,4)-cyclohexanediol, glycerine, pentaerythritol, 2,2-dimethyl-1,4-propanediol, 1,4-cyclohexanedimethanol and 2,2-bis (4'-hydroxy cyclohexyl)propane. Preferred examples of the compound (a) are ethylene glycol, 1,2-propanediol and 1,4-butanediol. A particularly preferred example of them is 1,4-butanediol.

Concrete examples of the compound (b) are diethylene glycol, dipropylene glycol, tetraethylene glycol and tetrapropylene glycol. Preferable example of them is diethylene glycol or dipropylene glycol.

Concrete examples of the compounds (c) are hydroquinone, resorcin, pyrogallol, pyrogallol-2-methyl ether and 2,2-bis(4'-hydroxyphenyl)propane. The preferable example is 2,2-bis(4'-hydroxyphenyl) propane.

Concrete example of the compound (d) is diethanolamide of coconut oil fatty acid.

The hydroxy compound is used in an amount of 2.5–150 mol% relative to the maleic anhydride moiety of the styrene-maleic anhydride copolymer resin. The preferred amount may be 5–120 mol%. In the case of the hydroxy compound being added in an amount less than 2.5 mol%, the pre-expanded copolymer particles must be overchanged, when molded, into a mold cavity by at least 20% more than capacity of the cavity in order to obtain foamed articles of desired quality. To use a far excessive amount of the hydroxy compound would be meaningless from a technical or economical point of view.

The reaction of the styrene-maleic anhydride copolymer resin and the hydroxy compound is conveniently conducted in a closed system. In this system, the reaction is usually continued, under stirring, for 4–60 hours (depending upon the reaction temperature, a size of the copolymer resin particles, a kind of the hydroxy compound used and so forth), at an elevated temperature e.g., a temperature from 80° to 150° C., preferably from 90° to 110° C., where a substatial formation of ester bond can be monitored, for instance, by infrared spectrum.

The hydroxy groups in the above mentioned hydroxy compound are believed to attack the anhydride groups in the molecular chain of the base resin and give half ester bonds. Further, it is believed that a kind of cross-linkage is formed through the half ester bond produced by the reaction of two hydroxy groups of the hydroxy compound with anhydride groups in the copolymers. Such chemical modification of the base resin is considered to provide various effects such as enhancement of the post-expandability of expandable copolymer particles which are impregnated with a blowing agent and improvement of thermal stability of foamed articles produced by the use of the expandable copolymer particles.

The impregnation of a volatile blowing agent to the copolymer resin particles may be conducted before, during or after the above mentioned reaction. The most preferred embodiment at industrial practice is to add the hydroxy compound and a blowing agent to the same reaction system and conduct the esterification as explained above and the impregnation in one treatment.

As the volatile blowing agents to be used in the invention, there may be mentioned aliphatic hydrocarbons such as propane, n-butane, i-butane, n-pentane, i-pentane, or n-hexane or aliphatic halogenated hydrocarbons such as methyl chloride, ethylchloride, dichlorodifluoromethane, chlorodifluoromethane or trichlorofluoromethane.

The preferred ones are propane, n(or i)-butane or n(or i)-pentane, or a mixture thereof. The blowing agent may be usually used in 3–40 w/w% relative to the copolymer resin.

When the blowing agent is added to the copolymer resin in the present invention, the addition to the aqueous medium of a solvent which can dissolve the copolymer resin is desired. The solvent would effect the reduction of pre-expansion time and also give pre-expanded particles of lower density. The solvent is preferred to use after emulsifying in an aqueous medium with stirring by a homomixer, so that the solvent is well impregnated into the copolymer resin.

As the solvents, there may be mentioned aromatic hydrocarbons such as benzene, toluene, xylene, ethylbenzene or the like, aliphatic acid esters such as methyl acetate, ethyl acetate or the like, aliphatic halogeneted hydrocarbons such as dichloroethane, trichloroethane, tetrachloroethane, trichloroethylene, tetrachloroethylene or the like, alicyclic hydrocarbons such as cyclohexane, cycloheptane or the like, or aliphatic hydrocarbons such as n-hexane, n-heptane or the like. The amount of the solvent may be 0.5–10 w/w% to the copolymer resin.

Furthermore, the copolymer resins used in the present invention may contain various additives such as filler (such as talc), plasticizer (such as dioctylphthalate), fire retardant [such as tris(2,3-dibromopropyl)-phosphate or hexabromocyclododecane], lubricant (such as chlorinated paraffin or low density polyethylene), colorant (such as orthophenylphenol, methyl salicylate, biphenyl, trichlorobenzene), ultraviolet absorbing agent (such as substituted hydroxyphenyl benzotriazoles), antioxidant (such as $\beta,\beta'$-thiopropionic acid esters) or the like.

In the production of a foamed article, it may be carried out in the following way.

(A) Pre-expansion Operation:

This may be conducted according to a conventional method, i.e., the above expandable copolymer particles are introduced into a normal batch type pre-expander or continuous pre-expander and subjected to heated steam having a pressure of about 0.2–0.3 kg/cm$^2$. The time of the steam injection may vary depending upon the bulk density of the pre-expanded copolymer particles desired. The resulting pre-expanded copolymer particles are then aged for approximately 12 hours in a silo.

(B) Molding Operation:

The above pre-expanded styrene-maleic anhydride copolymer particles may be molded by using a conventional molding machine. However, the molding surface of the mold cavity should be usually treated with mold release agent such as fluorine resins (e.g., polytetrafluoroethylene), because the copolymer particles of the present invention possess, when heated, an excellent adherability to the metal.

The pre-expanded copolymer particles are charged into the mold cavity whose amount would be sufficient to be substantially equal to the capacity of the mold cavity. However, in case the above copolymer particles are charged into a mold cavity of an automatic molding machine, the amount to be charged may be slightly more, e.g. 10% more, than the capacity of the mold cavity which, for facilitating the charge easier, is provided with a clearance of approximately 1-3 mm usually.

Then, after the charge, the mold cavity is closed and steam usually having a pressure of 0.5-2.0 kg/cm$^2$ is injected into the mold cavity for 30-180 sec so that the charged pre-expanded copolymer particles expand to fill the interstices and fuse together. The pressure and the injection time of the steam may vary depending upon the dimension of the foamed article to be obtained. The molding operation is completed by cooling the mold cavity with cold water. Thereafter the mold cavity is opened and the resulting foamed article is taken out therefrom.

Thus, the foamed molded article is obtained from the expandable styrene-maleic anhydride copolymer particles.

As mentioned before, the expandable styrene-maleic anhydride copolymer particles of the present invention have a good adherability to the metal. In case the metal sheet/plate, made of aluminum, galvanized steel, nickel, steel or copper, is to be laminated to a surface or both surfaces of the resulting foamed article in order to obtain a composite insulation board for construction, the metal sheet/plate may preferably be placed and retained on the molding surface by means of suction prior to the charge of the above pre-expanded copolymer particles. Otherwise it is possible to place the metal sheet/plate onto the mold cavity subsequently to the charge of the above pre-expanded copolymer particles.

The excellent post-expandability of the pre-expanded copolymer particles of the present invention makes the charge substantially equal to the capacity of the mold cavity employed. In a conventional automatic molding machine, however, a mold is usually provided with a clearance of about 1-3 mm for pneumatically charging the pre-expanded copolymer particles thereto, which requires a substantial overcharge by an amount equal to the capacity of the clearance. The pneumatically automatic convey of the pre-expanded copolymer particles assures "uniform" charge into the mold cavity, but the drop-wise charge from the silo doesn't. So in the latter, for example, the pre-expanded copolymer particles may be charged into the mold cavity in an amount approximately up to 10% more than the capacity thereof in order to obtain molded article of 40×182×91 cm. Further, in order to obtain a molded article of 5×182×91 cm by the automatic molding machine comprising a movable half of mold and a fixed half of mold, where approximately up to 3 mm of clearance is formed between the molds when closed, the pre-expanded polymer particles are overcharged into the mold cavity by approximately 6%. An amount of volume more than 110% of the capacity of the mold cavity is not advantageously charged because it only raises the density of the resulting foamed article.

The following examples are illustrative of the present invention.

EXAMPLE 1

To a 5 l autoclave were added 2800 g of water, 4.8 g of magnesium pyrophosphate (produced by a double decomposition method) and 0.2 g of sodium dodecylbenzene sulfonate, and then 1600 g of pellets (1.2 mm diameter×3 mm length) prepared from styrene-maleic anhydride copolymer containing 8.0% by weight of maleic anhydride and having an average degree of polymerization of 1200 ("Dylark"-232, a trade name, manufactured by ARCO/Polymers, Inc., U.S.A.). Further, 64 gl (46 mol% to the maleic anhydride moiety of the copolymer) of diethylene glycol and 64 g of toluene were added to the resulting suspension. Into the sealed autoclave, 160 g of n-butane as a blowing agent were put with stirring and the mixture was maintained for 18 hrs at 100° C. The mixture was then cooled to 30° C. and expandable particles impregnated with the blowing agent were taken out.

The particles after washing and drying were aged by maintaining for 72 hrs at 15° C. in a sealed vessel, and then heated for 20 mins in a flow of steam at 98° C. to give pre-expanded particles having bulk density of 0.013 g/cm$^3$.

The bulk density of the resulted pre-expanded particles was adjusted to 0.022 g/cm$^3$. 3000 cm$^3$ of the pre-expanded particles were charged in a mold cavity (30×40×2.5 cm, 3000 cm$^3$ in inner volume) and heated for 40 seconds in a steam of 1.0 kg/cm$^2$ (gauge pressure) to yield excellent molded foams having density of 0.022 g/cm$^3$. After annealing for 24 hrs at 50° C. and standing for 12 days in an air-circulating type constant temperature bath (90° C.), the molded foams showed 1.3% of heat shrinkage factor (in one direction). An absorption peak of ester bond was observed upon their Infrared spectrum. Also, when the above expandable particles were dipped in toluene, there remained a ball-like swollen and insoluble substance (about 15 w/w% of the particles) which is believed to be a crosslinked product. Further the part which was dissolved in toluene showed in an average degree of polymerization of 1500.

EXAMPLE 2 AND COMPARATIVE EXAMPLE 1

By using various hydroxy compounds instead of diethylene glycol, Example 1 was reported to obtain blowing agent-impregnated particles as well as pre-expanded particles thereof. The pre-expanded particles were molded and the obtained foamed articles were observed on density and heat shrinkage factor (in one direction). The results are shown in Table 1.

TABLE 1

| Hydroxy Compound | | | Pre-expanded Particle Bulk density (g/cm$^3$) | Foamed Article | |
|---|---|---|---|---|---|
| | Addition Amount | | | | |
| Name | Weight (g) | mol % to the anhydride moiety of copolymer | | Density (g/cm$^3$) | Heat Shrinkage factor (%, at 90° C., 12 days) |
| Diethylene glycol | 96 | 69 | 0.022 | 0.022 | 0.9 |
| Diethylene glycol | 32 | 23 | " | " | 1.3 |
| Diethylene glycol | 16 | 11 | " | 0.024 | 1.3 |
| Ethylene | 96 | 117 | " | 0.022 | 1.2 |

TABLE 1-continued

| | Hydroxy Compound | | Foamed Article | | |
|---|---|---|---|---|---|
| | Addition Amount | | | | |
| Name | Weight (g) | mol % to the anhydride moiety of copolymer | Pre-expanded Particle Bulk density (g/cm³) | Density (g/cm³) | Heat Shrinkage factor (%, at 90° C., 12 days) |
| Ethylene glycol | 16 | 19.5 | " | " | 1.4 |
| Dipropylene glycol | 48 | 27 | " | " | 1.2 |
| Propylene glycol (1,2-Propanediol) | 24 | 24.1 | " | " | 1.3 |
| Glycerine | 48 | 39.5 | " | " | 1.5 |
| 1,4-Butanediol | 48 | 40 | 0.022 | 0.022 | 1.3 |
| 2,2-Bis(4'-hydroxyphenyl)propane | 32 | 10 | " | " | 1.1 |
| Hydroquinone | 96 | 66.8 | " | " | 1.0 |
| 2,2-dimethyl-1,3-propanediol (Neopentyl glycol) | 24 | 17.7 | " | " | 1.2 |
| Diethanolamide of coconut fatty oil acid (Comparative Example 1) | 24 | 6.4 | " | " | 1.5 |
| 2,2-Bis(4'-hydroxyphenyl)propane | 4 | 1.3 | 0.022 | 0.027 | 1.5 |

EXAMPLE 3

To a 5 l autoclave were added 2800 g of water, 4.8 g of magnesium pyrophosphate (produced by a double decomposition method) and 0.2 g of sodium dodecylbenzene sulfonate, and then 1600 g of pellets (1.2 mm diameter×3 mm length) of styrene-maleic anhydride copolymer containing 8.0% by weight of maleic anhydride ("Dylark"-232, a trade name, manufactured by ARCO/Polymers, Inc., U.S.A.), 64 g (46 mol% to the maleic anhydride moiety of the copolymer) of diethylene glycol and 64 g of toluene. The resulting mixture was then heated to 100° C. with stirring and maintained for 18 hrs at the same temperature and then cooled to 30° C. (A part of the particles was picked up and dipped in toluene where a ball-like swollen and insoluble substance remained.). 160 g Of n-butane as a blowing agent were put into the sealed autoclave with stirring and the mixture was maintained for 8 hrs at 100° C. After cooling to 30° C., expandable particles impregnated with the blowing agent were taken out.

The obtained expandable particles showed the same expandability and moldability as those obtained in Example 1.

EXAMPLE 4

Instead of the copolymer of Example 1, styrene-maleic anhydride copolymers of A: 5 w/w% of maleic anhydride content (Dylark-232B) and an average degree of polymerization of 1400 and B: 14 w/w% of maleic anhydride content (Dylark-332) and an average degree of polymerization of 740 were used and treated in the same way as in Example 1, respectively. The properties of pre-expanded particles and foamed articles are as follows.

| Copolymer | Pre-expanded Particle Bulk Density (g/cm³) | Foamed Article Density (g/cm³) | Heat Shrinkage Factor (%, at 90° C., 12 days) |
|---|---|---|---|
| A | 0.025 | 0.025 | 1.9 |
| B | 0.05 | 0.05 | 0.7 |

COMPARATIVE EXAMPLE 2

Using 80 g of ethanol instead of 64 g of diethylene glycol of Example 1, Example 1 was repeated to obtain expandable particles. They were heated for 20 mins in a flow of steam at 98° C. to give pre-expanded particles having bulk density of 0.012 g/cm³.

After adjusting the bulk density of the resulted pre-expanded particles to 0.022 g/cm³, the particles were treated in the same mold cavity as in Example 1. The foamed articles having 0.027 g/cm³ or more of density showed a good moldability, while the article having 0.025 g/cm³ of density showed shrinkage on appearance. Besides the article having 0.027 g/cm³ of density was 1.7% of heat shrinkage factor (in one direction).

COMPARATIVE EXAMPLE 3

Without the addition of diethylene glycol, Example 1 was repeated to yield the expandable particles as well as the pre-expanded particles.

The foamed article having low density of 0.022 g/cm³ could be obtained in case where they were used in 50% excessive amount to the volume of mold cavity.

EXAMPLE 5 (MOLDING OPERATION)

The pre-expanded copolymer particles obtained in Example 1 were pneumatically charged into a mold cavity of 5×182×91 cm (capacity: 82810 cm³) formed by closing a fixed half of mold and a movable half of an automatic molding machine, where the molding surface of the mold cavity was previously treated with the mold release agent of polytetrafluoroethylene and a clearance of approximately 2 mm was provided between the molds for venting purpose. The amount charged was 104% of the capacity of the mold cavity formed. Subsequent to the charge, the above mold cavity was closed by moving the movable mold half to the fixed mold half. Then heated steam having a pressure of 0.2 kg/cm$^2$ was first injected for 20 sec and heated steam of 1.0 kg/cm$^2$ was injected followingly into the mold cavity for 40 sec. After the steam-heating, steam was discharged, and the molds were cooled by cold water for 40 sec. After the cooling, cold water was discharged and the molds were left to stand for 90 sec. After the standing, the movable mold half was moved away to open the mold cavity, the resulting foamed article was removed. The thus obtained foamed article was annealed at 50° C. for 24 hours, and the density of the foamed article was found approximately 0.023 g/cm$^3$. Its appearance was the same as that of Example 1.

EXAMPLE 6 (MOLDING OPERATION)

The above molding Example 5 was identically repeated except that an aluminum sheet (approximately 0.03×182×91 cm) was placed and retained, by means of suction, onto the molding surface of the movable mold half prior to charging the pre-expaned particles in an amount of 104.02% of the mold cavity formed. The thus obtained foamed article had the aluminum sheet firmly adhered thereto.

Then the peeling strength of the foamed article was measured according to ASTM 903-49 and found to be 0.7 kg/cm. On the peeled surface of the aluminum sheet there remained a portion of the foamed article.

COMPARATIVE EXAMPLE 4 (MOLDING OPERATION)

The above molding Example 5 was identically repeated except the use of pre-expanded styrene homopolymer particles instead of the pre-expanded copolymer particles of the present invention. The peeling strength of the resulted foamed article was 0 kg/cm and on the separated surface of the aluminum sheet there remained nothing.

What we claim is:

1. An expandable styrene-maleic anhydride copolymer particle which comprises a copolymer resin obtained by the reaction of a styrene-maleic anhydride copolymer with a hydroxy compound having 2-4 active hydroxy groups and 2-15 carbon atoms in an amount of 2.5-150 mol% relative to the maleic anhydride moiety of said copolymer and further impregnated with a volatile blowing agent.

2. The expandable styrene-maleic anhydride copolymer particle of claim 1 in which the styrene-maleic anhydride copolymer is one containing 2-25 w/w% of maleic anhydride component and having an average degree of polymerization of 500-4000.

3. The expandable styrene-maleic anhydride copolymer particle of claim 2 in which the styrene-maleic anhydride copolymer is one containing 5-15 w/w% of maleic anhydride component and having an average degree of polymerization of 900-2000.

4. The expandable styrene-maleic anhydride copolymer particle of claim 1 in which the hydroxy compound having 2-4 active hydroxy groups is a compound selected from the group consisting of
(a) a compound of the formula: HO—R—OH
wherein R is a straight or branched-chain alkylene group having 2-6 carbon atoms which may be substituted with one or two hydroxy groups;
a group of the formula:

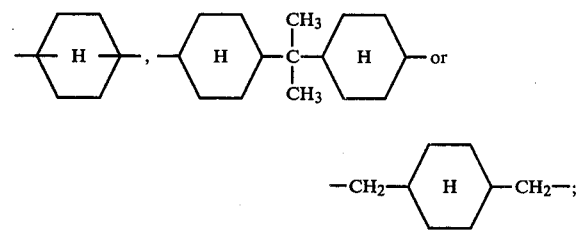

(b) a compound of the formula: H—(OR$_1$)n—OH
wherein n is an integer of 2-6 and R$_1$ is a straight-chain alkylene group of 2-4 carbon atoms;
(c) a polyhydric phenol which may be substituted by a lower alkyl group or a halogen atom and
(d) an alkanolyl diethanolamide.

5. The expandable styrene-maleic anhydride copolymer particle of claim 4 in which the hydroxy compound is 1,4-butanediol.

6. The expandable styrene-maleic anhydride copolymer particle of claim 4 in which the hydroxy compound is diethylene glycol or dipropylene glycol.

7. The expandable styrene-maleic anhydride copolymer particle of claim 4 in which the hydroxy compound is 2,2-bis (4'-hydroxyphenyl)propane.

8. The expandable styrene-maleic anhydride copolymer particle of claim 1 in which the hydroxy compound is used in an amount of 5-120 mol% relative to the maleic anhydride moiety of the copolymer.

9. The expandable styrene-maleic anhydride copolymer particle of claim 1 in which the volatile blowing agent is a straight-chain, cyclic or halogen-substituted hydrocarbon.

* * * * *